United States Patent
Ray

(10) Patent No.: US 8,111,692 B2
(45) Date of Patent: Feb. 7, 2012

(54) SYSTEM AND METHOD FOR MODIFYING NETWORK TRAFFIC

(75) Inventor: Amar Ray, Shawnee, KS (US)

(73) Assignee: Embarq Holdings Company LLC, Overland Park, KS (US)

( * ) Notice: Subject to any disclaimer, the term of this patent is extended or adjusted under 35 U.S.C. 154(b) by 0 days.

(21) Appl. No.: 12/769,176

(22) Filed: Apr. 28, 2010

(65) Prior Publication Data

US 2010/0208611 A1    Aug. 19, 2010

Related U.S. Application Data

(63) Continuation-in-part of application No. 12/052,562, filed on Mar. 20, 2008, now abandoned, and a continuation-in-part of application No. 12/128,763, filed on May 29, 2008, and a continuation-in-part of application No. 12/044,821, filed on Mar. 7, 2008, and a continuation-in-part of application No. 11/809,407, filed on May 31, 2007.

(51) Int. Cl.
*H04L 12/28* (2006.01)

(52) U.S. Cl. ........ 370/389; 370/351; 370/392; 709/222; 709/230

(58) Field of Classification Search .................. 370/351, 370/389, 392; 709/223, 230
See application file for complete search history.

(56) References Cited

U.S. PATENT DOCUMENTS

| | | | |
|---|---|---|---|
| 4,612,416 A | 9/1986 | Emerson et al. | |
| 4,771,448 A | 9/1988 | Koohgoli et al. | |
| 4,831,649 A | 5/1989 | Mejane | |
| 5,042,027 A | 8/1991 | Takase et al. | |
| 5,132,966 A | 7/1992 | Hayano et al. | |
| 5,408,465 A | 4/1995 | Gusella et al. | |
| 5,477,529 A | 12/1995 | Gingell | |
| 5,479,447 A | 12/1995 | Chow et al. | |
| 5,521,910 A | 5/1996 | Matthews | |
| 5,539,815 A | 7/1996 | Samba | |
| 5,574,934 A | 11/1996 | Mirashrafi et al. | |
| 5,581,482 A | 12/1996 | Wiedenman et al. | |

(Continued)

FOREIGN PATENT DOCUMENTS

GB    2401283    3/2004

OTHER PUBLICATIONS

ITU-T Newslog, Operators Given Performance Management for Ethernet with New Standard [Retrieved from ITU-T Newslog, <URL:http://www.itu.int/ITU-T/newslog/default, date, Feb. 8, 2006, aspx>] Feb. 6, 2006.

(Continued)

*Primary Examiner* — Huy Vu
*Assistant Examiner* — Maria Sekul
(74) *Attorney, Agent, or Firm* — Patton Boggs LLP

(57) ABSTRACT

The disclosed embodiments include a system and method for modifying network traffic. For example, in one embodiment, the method includes receiving a packet at an intermediate network node at a network layer. The method determines at the intermediate network node whether layer injection can be performed at the intermediate network node. If layer injection can be performed at the intermediate network node, the method identifies at least one application or protocol associated with the packet using deep packet inspection. The method determines a routing modification based on the identified application protocol. The method then performs the routing modification on the packet.

19 Claims, 7 Drawing Sheets

U.S. PATENT DOCUMENTS

| | | |
|---|---|---|
| 5,621,663 A | 4/1997 | Skagerling |
| 5,627,766 A | 5/1997 | Beaven |
| 5,638,514 A | 6/1997 | Yoshida et al. |
| 5,675,578 A | 10/1997 | Gruber et al. |
| 5,680,425 A | 10/1997 | Morzano |
| 5,726,979 A | 3/1998 | Henderson et al. |
| 5,757,784 A | 5/1998 | Liebowitz et al. |
| 5,793,976 A | 8/1998 | Chen et al. |
| 5,878,097 A | 3/1999 | Hase et al. |
| 5,883,819 A | 3/1999 | Abu-Amara et al. |
| 5,901,141 A | 5/1999 | Gruber et al. |
| 5,903,558 A | 5/1999 | Jones et al. |
| 5,917,821 A | 6/1999 | Gobuyan et al. |
| 5,931,679 A | 8/1999 | Funahashi |
| 5,953,318 A | 9/1999 | Nattkemper et al. |
| 5,963,146 A | 10/1999 | Johnson et al. |
| 5,970,064 A | 10/1999 | Clark et al. |
| 6,011,798 A | 1/2000 | McAlpine |
| 6,047,326 A | 4/2000 | Kilkki |
| 6,055,578 A | 4/2000 | Williams et al. |
| 6,058,102 A | 5/2000 | Drysdale et al. |
| 6,064,673 A | 5/2000 | Anderson et al. |
| 6,081,505 A | 6/2000 | Kilkki |
| 6,108,306 A | 8/2000 | Kalkunte et al. |
| 6,115,393 A | 9/2000 | Engel et al. |
| 6,141,341 A | 10/2000 | Jones et al. |
| 6,167,025 A | 12/2000 | Hsing et al. |
| 6,185,198 B1 | 2/2001 | LaDue |
| 6,201,719 B1 | 3/2001 | He et al. |
| 6,209,033 B1 | 3/2001 | Datta et al. |
| 6,215,769 B1 | 4/2001 | Ghani et al. |
| 6,236,996 B1 | 5/2001 | Bapat et al. |
| 6,260,072 B1 | 7/2001 | Rodriguez-Moral |
| 6,269,401 B1 | 7/2001 | Fletcher et al. |
| 6,272,151 B1 | 8/2001 | Gupta et al. |
| 6,282,274 B1 | 8/2001 | Jain et al. |
| 6,327,620 B1 | 12/2001 | Tams et al. |
| 6,327,677 B1 | 12/2001 | Garg et al. |
| 6,338,046 B1 | 1/2002 | Saari et al. |
| 6,341,270 B1 | 1/2002 | Esposito et al. |
| 6,363,056 B1 | 3/2002 | Beigi et al. |
| 6,370,114 B1 | 4/2002 | Gullicksen et al. |
| 6,377,982 B1 | 4/2002 | Rai et al. |
| 6,381,221 B1 | 4/2002 | Legouet-Camus et al. |
| 6,381,228 B1 | 4/2002 | Prieto et al. |
| 6,384,744 B1 | 5/2002 | Philyaw et al. |
| 6,389,005 B1 | 5/2002 | Cruickshank |
| 6,397,359 B1 | 5/2002 | Chandra et al. |
| 6,401,121 B1 | 6/2002 | Yoshida et al. |
| 6,404,746 B1 | 6/2002 | Cave et al. |
| 6,421,356 B2 | 7/2002 | Carter et al. |
| 6,434,618 B1 * | 8/2002 | Cohen et al. .................. 709/228 |
| 6,453,359 B1 | 9/2002 | Bender et al. |
| 6,460,055 B1 | 10/2002 | Midgley et al. |
| 6,473,793 B1 | 10/2002 | Dillon et al. |
| 6,477,590 B1 | 11/2002 | Habusha et al. |
| 6,493,547 B1 | 12/2002 | Raith |
| 6,502,131 B1 | 12/2002 | Vaid et al. |
| 6,529,475 B1 | 3/2003 | Wan et al. |
| 6,530,032 B1 | 3/2003 | Shew et al. |
| 6,535,504 B1 | 3/2003 | Johnson et al. |
| 6,542,466 B1 | 4/2003 | Pashtan et al. |
| 6,549,946 B1 | 4/2003 | Fisher et al. |
| 6,560,199 B1 | 5/2003 | Hoshino |
| 6,594,268 B1 | 7/2003 | Aukia et al. |
| 6,594,277 B1 | 7/2003 | Chiang et al. |
| 6,597,683 B1 | 7/2003 | Gehring et al. |
| 6,614,781 B1 | 9/2003 | Elliott et al. |
| 6,615,261 B1 | 9/2003 | Smorgrav |
| 6,628,629 B1 | 9/2003 | Jorgensen |
| 6,633,835 B1 | 10/2003 | Moran et al. |
| 6,646,987 B1 | 11/2003 | Qaddoura |
| 6,651,030 B2 | 11/2003 | Victor et al. |
| 6,654,803 B1 | 11/2003 | Rochford et al. |
| 6,657,957 B1 | 12/2003 | Cheung et al. |
| 6,665,264 B1 | 12/2003 | Davison et al. |
| 6,665,714 B1 | 12/2003 | Blumenau et al. |
| 6,678,250 B1 | 1/2004 | Grabelsky et al. |
| 6,678,524 B1 | 1/2004 | Hansson et al. |
| 6,684,253 B1 | 1/2004 | Whitaker et al. |
| 6,690,646 B1 | 2/2004 | Fichou et al. |
| 6,721,405 B1 | 4/2004 | Nolting et al. |
| 6,741,563 B2 | 5/2004 | Packer |
| 6,741,572 B1 | 5/2004 | Graves et al. |
| 6,748,247 B1 | 6/2004 | Ramakrishnan et al. |
| 6,751,777 B2 | 6/2004 | Bates et al. |
| 6,754,221 B1 | 6/2004 | Whitcher et al. |
| 6,757,255 B1 | 6/2004 | Aoki et al. |
| 6,763,380 B1 | 7/2004 | Mayton et al. |
| 6,765,864 B1 | 7/2004 | Natarajan et al. |
| 6,785,259 B2 | 8/2004 | Le et al. |
| 6,785,285 B1 | 8/2004 | Romana et al. |
| 6,798,755 B2 | 9/2004 | Lillie et al. |
| 6,798,786 B1 | 9/2004 | Lo et al. |
| 6,804,240 B1 | 10/2004 | Shirakawa et al. |
| 6,807,515 B2 | 10/2004 | Vogel et al. |
| 6,816,463 B2 | 11/2004 | Cooper et al. |
| 6,836,800 B1 | 12/2004 | Sweet et al. |
| 6,839,070 B2 | 1/2005 | Meandzija et al. |
| 6,839,356 B2 | 1/2005 | Barany et al. |
| 6,839,747 B1 | 1/2005 | Blumenau et al. |
| 6,868,094 B1 | 3/2005 | Bordonaro et al. |
| 6,891,822 B1 | 5/2005 | Gibbi et al. |
| 6,892,336 B1 | 5/2005 | Giorgetta et al. |
| 6,912,231 B2 | 6/2005 | White et al. |
| 6,925,060 B2 | 8/2005 | Mangin |
| 6,925,424 B2 | 8/2005 | Jones et al. |
| 6,925,493 B1 | 8/2005 | Barkan et al. |
| 6,931,354 B2 | 8/2005 | Jones et al. |
| 6,934,249 B1 | 8/2005 | Bertin et al. |
| 6,934,749 B1 | 8/2005 | Black et al. |
| 6,937,359 B2 | 8/2005 | Chandra et al. |
| 6,937,713 B1 | 8/2005 | Kung et al. |
| 6,940,832 B2 | 9/2005 | Saadawi et al. |
| 6,944,673 B2 | 9/2005 | Malan et al. |
| 6,947,379 B1 | 9/2005 | Gleichauf et al. |
| 6,950,407 B1 | 9/2005 | Huddle |
| 6,965,614 B1 | 11/2005 | Osterhout et al. |
| 6,968,374 B2 | 11/2005 | Lemieux et al. |
| 6,973,662 B1 | 12/2005 | Sie et al. |
| 6,975,617 B2 | 12/2005 | Walker et al. |
| 6,978,223 B2 | 12/2005 | Milliken |
| 6,985,901 B1 | 1/2006 | Sachse et al. |
| 6,999,419 B2 | 2/2006 | Ise et al. |
| 7,002,992 B1 | 2/2006 | Shaffer et al. |
| 7,006,526 B1 | 2/2006 | Biederman |
| 7,007,107 B1 | 2/2006 | Ivchenko et al. |
| 7,013,322 B2 | 3/2006 | Lahr |
| 7,013,338 B1 | 3/2006 | Nag et al. |
| 7,013,349 B2 | 3/2006 | Idsinga |
| 7,020,082 B2 | 3/2006 | Bhagavath et al. |
| 7,020,085 B2 | 3/2006 | Mimura et al. |
| 7,020,696 B1 | 3/2006 | Perry et al. |
| 7,023,839 B1 | 4/2006 | Shaffer et al. |
| 7,024,475 B1 | 4/2006 | Abaye et al. |
| 7,035,220 B1 | 4/2006 | Simcoe |
| 7,035,291 B2 | 4/2006 | Grinfeld |
| 7,039,015 B1 | 5/2006 | Vallone et al. |
| 7,039,709 B1 | 5/2006 | Beadle et al. |
| 7,051,098 B2 | 5/2006 | Masters et al. |
| 7,058,727 B2 | 6/2006 | Dingsor et al. |
| 7,061,856 B2 | 6/2006 | Banerjee |
| 7,062,259 B1 | 6/2006 | Dispensa et al. |
| 7,068,607 B2 | 6/2006 | Partain et al. |
| 7,082,315 B2 | 7/2006 | Bar-On |
| 7,088,678 B1 | 8/2006 | Freed et al. |
| 7,092,696 B1 | 8/2006 | Hosain et al. |
| 7,096,260 B1 | 8/2006 | Zavalkovsky et al. |
| 7,099,879 B2 | 8/2006 | Tacaille et al. |
| 7,099,942 B1 | 8/2006 | Wilson et al. |
| 7,100,005 B2 | 8/2006 | Pearl |
| 7,107,273 B2 | 9/2006 | Ohata et al. |
| 7,124,211 B2 | 10/2006 | Dickson et al. |
| 7,127,617 B2 | 10/2006 | Wiederin et al. |
| 7,133,368 B2 | 11/2006 | Zhang et al. |
| 7,142,516 B2 | 11/2006 | Lev et al. |
| 7,180,866 B1 | 2/2007 | Chartre et al. |

| Patent | Date | Inventor |
|---|---|---|
| 7,184,401 B2 | 2/2007 | Foore et al. |
| 7,184,777 B2 | 2/2007 | Diener et al. |
| 7,194,002 B2 | 3/2007 | Zhang et al. |
| 7,197,546 B1 | 3/2007 | Bagga et al. |
| 7,206,593 B1 | 4/2007 | Yarkosky et al. |
| 7,209,473 B1 | 4/2007 | Mohaban et al. |
| 7,222,147 B1 | 5/2007 | Black et al. |
| 7,222,190 B2 | 5/2007 | Klinker et al. |
| 7,224,974 B2 | 5/2007 | Benco et al. |
| 7,246,045 B1 | 7/2007 | Rappaport et al. |
| 7,246,159 B2 | 7/2007 | Aggarwal et al. |
| 7,248,560 B1 | 7/2007 | Blankenship et al. |
| 7,248,604 B2 | 7/2007 | Sugar et al. |
| 7,257,080 B2 | 8/2007 | Martin |
| 7,260,635 B2 | 8/2007 | Pandya et al. |
| 7,263,067 B2 | 8/2007 | Sreemanthula et al. |
| 7,266,122 B1 | 9/2007 | Hogg et al. |
| 7,266,754 B2 | 9/2007 | Shah et al. |
| 7,277,913 B2 | 10/2007 | Kashyap |
| 7,283,474 B1 | 10/2007 | Bergenwall |
| 7,292,531 B1 | 11/2007 | Hill |
| 7,304,942 B1 | 12/2007 | Malladi et al. |
| 7,307,989 B2 | 12/2007 | Ofek |
| 7,310,334 B1 | 12/2007 | FitzGerald et al. |
| 7,313,129 B1 | 12/2007 | Bova et al. |
| 7,330,434 B2 | 2/2008 | Murooka et al. |
| 7,333,438 B1 | 2/2008 | Rabie et al. |
| 7,349,960 B1 | 3/2008 | Pothier et al. |
| 7,360,083 B1 | 4/2008 | Ragireddy et al. |
| 7,369,498 B1 | 5/2008 | Habusha et al. |
| 7,376,731 B2 | 5/2008 | Khan et al. |
| 7,385,997 B2 | 6/2008 | Gorti et al. |
| 7,389,537 B1 | 6/2008 | Callon et al. |
| 7,391,721 B1 | 6/2008 | Holbrook |
| 7,406,029 B1 | 7/2008 | Ciancaglini et al. |
| 7,411,966 B2 | 8/2008 | Bruckner et al. |
| 7,412,507 B2 | 8/2008 | Saxena et al. |
| 7,417,949 B2 | 8/2008 | Weller et al. |
| 7,447,164 B2 | 11/2008 | Ueda et al. |
| 7,450,928 B1 | 11/2008 | Henry, et al. |
| 7,457,868 B1 | 11/2008 | Guo |
| 7,460,493 B1 | 12/2008 | Dhanoa et al. |
| 7,463,634 B1 | 12/2008 | Hansen |
| 7,471,653 B2 | 12/2008 | McConnell et al. |
| 7,472,192 B2 | 12/2008 | DeFerranti et al. |
| 7,477,657 B1 | 1/2009 | Murphy et al. |
| 7,483,437 B1 | 1/2009 | Mohaban |
| 7,492,708 B2 | 2/2009 | Ge et al. |
| 7,499,407 B2 | 3/2009 | Holness et al. |
| 7,502,841 B2 | 3/2009 | Small et al. |
| 7,505,412 B2 | 3/2009 | Miyake et al. |
| 7,515,542 B2 | 4/2009 | Hertoghs et al. |
| 7,519,700 B1 | 4/2009 | Sapsford et al. |
| 7,519,725 B2 | 4/2009 | Alvarez et al. |
| 7,529,192 B2 | 5/2009 | Labovitz |
| 7,535,913 B2 | 5/2009 | Minami et al. |
| 7,539,241 B1 | 5/2009 | Dick |
| 7,542,440 B2 | 6/2009 | Rajkotia |
| 7,552,233 B2 | 6/2009 | Raju et al. |
| 7,590,718 B2 | 9/2009 | Gilmour et al. |
| 7,593,321 B2 | 9/2009 | Galand et al. |
| 7,602,725 B2 | 10/2009 | Vaught |
| 7,613,118 B2 | 11/2009 | Appanna et al. |
| 7,613,142 B2 | 11/2009 | Molteni et al. |
| 7,616,573 B2 | 11/2009 | Olesinski et al. |
| 7,623,550 B2 | 11/2009 | Forbes |
| 7,627,627 B2 | 12/2009 | Helliwell et al. |
| 7,643,414 B1 | 1/2010 | Minhazuddin |
| 7,649,837 B1 * | 1/2010 | Puuskari .................. 370/225 |
| 7,653,005 B2 | 1/2010 | Zout et al. |
| 7,653,725 B2 | 1/2010 | Yahiro et al. |
| 7,684,332 B2 | 3/2010 | Ray et al. |
| 7,715,353 B2 | 5/2010 | Jain et al. |
| 7,733,787 B1 | 6/2010 | Paterson et al. |
| 7,751,780 B2 | 7/2010 | Saidi et al. |
| 7,756,032 B2 | 7/2010 | Feick et al. |
| 7,765,294 B2 | 7/2010 | Edwards et al. |
| 7,802,008 B2 | 9/2010 | Akinlar et al. |
| 7,808,918 B2 | 10/2010 | Bugenhagen |
| 7,843,831 B2 | 11/2010 | Morrill et al. |
| 7,852,749 B2 | 12/2010 | Mickle et al. |
| 7,889,660 B2 | 2/2011 | Bugenhagen |
| 7,940,735 B2 | 5/2011 | Kozisek et al. |
| 7,948,909 B2 | 5/2011 | Bugenhagen |
| 8,000,318 B2 | 8/2011 | Wiley et al. |
| 2001/0002195 A1 | 5/2001 | Fellman et al. |
| 2001/0006899 A1 | 7/2001 | Khullar et al. |
| 2001/0036181 A1 | 11/2001 | Rogers |
| 2001/0038610 A1 | 11/2001 | Decker et al. |
| 2002/0015386 A1 | 2/2002 | Kajiwara |
| 2002/0027886 A1 | 3/2002 | Fischer et al. |
| 2002/0032871 A1 | 3/2002 | Malan et al. |
| 2002/0044528 A1 | 4/2002 | Pogrebinsky et al. |
| 2002/0068543 A1 | 6/2002 | Shah |
| 2002/0075869 A1 | 6/2002 | Shah et al. |
| 2002/0093948 A1 | 7/2002 | Dertz et al. |
| 2002/0107966 A1 | 8/2002 | Baudot et al. |
| 2002/0115429 A1 | 8/2002 | Deluca et al. |
| 2002/0129295 A1 | 9/2002 | Nishioka et al. |
| 2002/0135611 A1 | 9/2002 | Deosaran et al. |
| 2002/0145982 A1 | 10/2002 | Talpade et al. |
| 2002/0145998 A1 | 10/2002 | Hagirahim |
| 2002/0147389 A1 | 10/2002 | Cavallaro et al. |
| 2002/0165957 A1 | 11/2002 | Devoe et al. |
| 2002/0176131 A1 | 11/2002 | Walters et al. |
| 2002/0186660 A1 | 12/2002 | Bahadiroglu |
| 2002/0186665 A1 | 12/2002 | Chaffee et al. |
| 2002/0191618 A1 | 12/2002 | Mattathil |
| 2003/0005144 A1 | 1/2003 | Engel et al. |
| 2003/0012138 A1 | 1/2003 | Abdelilah et al. |
| 2003/0046388 A1 | 3/2003 | Milliken |
| 2003/0064720 A1 | 4/2003 | Valins et al. |
| 2003/0067877 A1 | 4/2003 | Sivakumar et al. |
| 2003/0067884 A1 | 4/2003 | Abler et al. |
| 2003/0088671 A1 | 5/2003 | Klinker et al. |
| 2003/0100308 A1 | 5/2003 | Rusch |
| 2003/0117964 A1 | 6/2003 | Chen et al. |
| 2003/0118029 A1 | 6/2003 | Maher et al. |
| 2003/0120594 A1 | 6/2003 | Shaginaw et al. |
| 2003/0128692 A1 | 7/2003 | Mitsumori et al. |
| 2003/0137997 A1 | 7/2003 | Keating |
| 2003/0142625 A1 | 7/2003 | Wan et al. |
| 2003/0147386 A1 | 8/2003 | Zhang et al. |
| 2003/0172291 A1 | 9/2003 | Judge et al. |
| 2003/0182410 A1 | 9/2003 | Balan et al. |
| 2003/0182432 A1 | 9/2003 | Lawson |
| 2003/0185210 A1 | 10/2003 | McCormack |
| 2003/0189900 A1 | 10/2003 | Barany et al. |
| 2003/0189943 A1 | 10/2003 | Gorti et al. |
| 2003/0198187 A1 | 10/2003 | Mellquist et al. |
| 2003/0198209 A1 | 10/2003 | Schwengler et al. |
| 2003/0235209 A1 | 12/2003 | Garg et al. |
| 2003/0236745 A1 | 12/2003 | Hartsell et al. |
| 2004/0025172 A1 | 2/2004 | Bain et al. |
| 2004/0032860 A1 | 2/2004 | Mundra et al. |
| 2004/0034793 A1 | 2/2004 | Yuan |
| 2004/0049596 A1 | 3/2004 | Schuehler et al. |
| 2004/0054680 A1 | 3/2004 | Kelley et al. |
| 2004/0058651 A1 | 3/2004 | Ross et al. |
| 2004/0073641 A1 | 4/2004 | Minhazuddin et al. |
| 2004/0073690 A1 | 4/2004 | Hepworth et al. |
| 2004/0088244 A1 | 5/2004 | Bartter et al. |
| 2004/0098473 A1 | 5/2004 | Yodaiken |
| 2004/0101302 A1 | 5/2004 | Kim et al. |
| 2004/0103216 A1 | 5/2004 | Lane |
| 2004/0110507 A1 | 6/2004 | Ramakrishnan et al. |
| 2004/0117502 A1 | 6/2004 | Rosengard et al. |
| 2004/0139106 A1 | 7/2004 | Bachman et al. |
| 2004/0153382 A1 | 8/2004 | Boccuzzi et al. |
| 2004/0155899 A1 | 8/2004 | Conrad |
| 2004/0158704 A1 | 8/2004 | Oates et al. |
| 2004/0160979 A1 | 8/2004 | Pepin et al. |
| 2004/0223505 A1 | 11/2004 | Kim et al. |
| 2004/0230572 A1 | 11/2004 | Omoigui |
| 2004/0240405 A1 | 12/2004 | Okazaki |
| 2004/0240454 A1 | 12/2004 | Yamauchi et al. |
| 2004/0242219 A1 | 12/2004 | Oie et al. |
| 2004/0246895 A1 | 12/2004 | Feyerbend |

| | | |
|---|---|---|
| 2004/0252718 A1 | 12/2004 | Miyamoto |
| 2004/0258226 A1 | 12/2004 | Host |
| 2004/0261116 A1 | 12/2004 | McKeown et al. |
| 2004/0264961 A1 | 12/2004 | Nam et al. |
| 2004/0267948 A1* | 12/2004 | Oliver et al. ............... 709/230 |
| 2005/0002331 A1 | 1/2005 | Nolle et al. |
| 2005/0025059 A1 | 2/2005 | Rajan et al. |
| 2005/0027851 A1 | 2/2005 | McKeown et al. |
| 2005/0027870 A1 | 2/2005 | Trebes |
| 2005/0043026 A1 | 2/2005 | Brok et al. |
| 2005/0071494 A1 | 3/2005 | Rundquist et al. |
| 2005/0075957 A1 | 4/2005 | Pincus et al. |
| 2005/0083886 A1 | 4/2005 | Ikeda |
| 2005/0086336 A1 | 4/2005 | Haber |
| 2005/0089040 A1 | 4/2005 | Kim |
| 2005/0089043 A1 | 4/2005 | Seckin et al. |
| 2005/0135379 A1 | 6/2005 | Callaway et al. |
| 2005/0138517 A1 | 6/2005 | Monitzer |
| 2005/0157751 A1 | 7/2005 | Rabie et al. |
| 2005/0163047 A1 | 7/2005 | McGregor et al. |
| 2005/0169186 A1 | 8/2005 | Qiu et al. |
| 2005/0180338 A1 | 8/2005 | Pirila et al. |
| 2005/0181814 A1 | 8/2005 | Okamoto |
| 2005/0201414 A1 | 9/2005 | Awais |
| 2005/0204036 A1 | 9/2005 | Farhat et al. |
| 2005/0204162 A1 | 9/2005 | Rayes et al. |
| 2005/0208950 A1 | 9/2005 | Hasse |
| 2005/0220035 A1 | 10/2005 | Ling et al. |
| 2005/0223097 A1 | 10/2005 | Ramsayer et al. |
| 2005/0228885 A1 | 10/2005 | Winfield et al. |
| 2005/0235058 A1 | 10/2005 | Rackus et al. |
| 2005/0238026 A1 | 10/2005 | Wu et al. |
| 2005/0249124 A1 | 11/2005 | Elie-Dit-Cosaque et al. |
| 2005/0249206 A1 | 11/2005 | Wybenga et al. |
| 2005/0254435 A1 | 11/2005 | Moakley et al. |
| 2005/0260993 A1 | 11/2005 | Lovell |
| 2005/0262240 A1 | 11/2005 | Drees et al. |
| 2005/0289232 A1 | 12/2005 | Ebert |
| 2006/0002370 A1 | 1/2006 | Rabie et al. |
| 2006/0015773 A1 | 1/2006 | Singh |
| 2006/0020700 A1 | 1/2006 | Qiu et al. |
| 2006/0023638 A1 | 2/2006 | Monaco |
| 2006/0023642 A1 | 2/2006 | Roskowski et al. |
| 2006/0072555 A1 | 4/2006 | St. Hilaire et al. |
| 2006/0092976 A1* | 5/2006 | Lakshman et al. ............ 370/469 |
| 2006/0094440 A1 | 5/2006 | Meier et al. |
| 2006/0104264 A1 | 5/2006 | Cho |
| 2006/0106919 A1 | 5/2006 | Watkinson et al. |
| 2006/0109839 A1 | 5/2006 | Hino et al. |
| 2006/0114818 A1 | 6/2006 | Canali et al. |
| 2006/0114888 A1 | 6/2006 | Schuman |
| 2006/0135118 A1 | 6/2006 | Claussen et al. |
| 2006/0143098 A1 | 6/2006 | Lazaridis |
| 2006/0159006 A1 | 7/2006 | Yeon et al. |
| 2006/0159008 A1 | 7/2006 | Sridhar et al. |
| 2006/0164982 A1 | 7/2006 | Arora et al. |
| 2006/0171314 A1 | 8/2006 | Qian et al. |
| 2006/0205410 A1 | 9/2006 | Black |
| 2006/0209685 A1 | 9/2006 | Rahman et al. |
| 2006/0218059 A1 | 9/2006 | Hartley et al. |
| 2006/0239204 A1 | 10/2006 | Bordonaro et al. |
| 2006/0239296 A1 | 10/2006 | Jinzaki et al. |
| 2006/0242309 A1 | 10/2006 | Damick et al. |
| 2006/0244818 A1 | 11/2006 | Majors et al. |
| 2006/0245369 A1 | 11/2006 | Schimmelpfeng et al. |
| 2006/0251050 A1 | 11/2006 | Karlsson |
| 2006/0256721 A1 | 11/2006 | Yarlagadda et al. |
| 2006/0256810 A1 | 11/2006 | Yarlagadda et al. |
| 2006/0262772 A1 | 11/2006 | Guichard et al. |
| 2006/0270385 A1 | 11/2006 | Morris |
| 2006/0271677 A1 | 11/2006 | Mercier |
| 2006/0285501 A1 | 12/2006 | Damm |
| 2006/0286980 A1 | 12/2006 | Hua |
| 2007/0014290 A1 | 1/2007 | Dec et al. |
| 2007/0025255 A1 | 2/2007 | Noble |
| 2007/0025258 A1 | 2/2007 | Chen |
| 2007/0036151 A1 | 2/2007 | Baeder |
| 2007/0076754 A1 | 4/2007 | Krishnaswamy |
| 2007/0083643 A1 | 4/2007 | Arndt et al. |
| 2007/0094374 A1 | 4/2007 | Karia |
| 2007/0097985 A1 | 5/2007 | Lee |
| 2007/0117538 A1 | 5/2007 | Weiser et al. |
| 2007/0133403 A1 | 6/2007 | Hepworth et al. |
| 2007/0133441 A1 | 6/2007 | Kang et al. |
| 2007/0140202 A1 | 6/2007 | Calhoun et al. |
| 2007/0140301 A1 | 6/2007 | Kailash et al. |
| 2007/0147247 A1 | 6/2007 | Kalonji et al. |
| 2007/0171937 A1 | 7/2007 | Boatright et al. |
| 2007/0180142 A1 | 8/2007 | Small et al. |
| 2007/0189247 A1 | 8/2007 | Wang et al. |
| 2007/0201485 A1 | 8/2007 | Rabipour |
| 2007/0211717 A1 | 9/2007 | Capps et al. |
| 2007/0217377 A1 | 9/2007 | Takeuchi |
| 2007/0223388 A1 | 9/2007 | Arad et al. |
| 2007/0223493 A1 | 9/2007 | Sridhar et al. |
| 2007/0237085 A1 | 10/2007 | Tirumalai et al. |
| 2007/0255846 A1 | 11/2007 | Wee et al. |
| 2007/0263535 A1 | 11/2007 | Shabtay |
| 2007/0268817 A1 | 11/2007 | Smallegange et al. |
| 2007/0286195 A1* | 12/2007 | Ilnickl et al. ............... 370/392 |
| 2007/0298763 A1 | 12/2007 | Clayton |
| 2008/0002669 A1 | 1/2008 | O'Brien et al. |
| 2008/0013531 A1 | 1/2008 | Elliott et al. |
| 2008/0014908 A1 | 1/2008 | Vasant |
| 2008/0016402 A1 | 1/2008 | Harel et al. |
| 2008/0031145 A1 | 2/2008 | Ethier et al. |
| 2008/0043716 A1 | 2/2008 | Toombs et al. |
| 2008/0049625 A1 | 2/2008 | Edwards et al. |
| 2008/0049637 A1 | 2/2008 | Morrill et al. |
| 2008/0049745 A1 | 2/2008 | Edwards et al. |
| 2008/0049775 A1 | 2/2008 | Morrill et al. |
| 2008/0062986 A1 | 3/2008 | Shand et al. |
| 2008/0101338 A1 | 5/2008 | Reynolds et al. |
| 2008/0101364 A1 | 5/2008 | Chow et al. |
| 2008/0112333 A1 | 5/2008 | Busch et al. |
| 2008/0165687 A1 | 7/2008 | Wang |
| 2008/0279183 A1 | 11/2008 | Wiley et al. |
| 2009/0059881 A1 | 3/2009 | Theobold et al. |
| 2009/0070454 A1 | 3/2009 | McKinnon et al. |
| 2009/0086649 A1 | 4/2009 | Van Der Burg et al. |
| 2009/0116497 A1 | 5/2009 | Varma et al. |
| 2009/0177742 A1 | 7/2009 | Rhoads et al. |
| 2009/0201828 A1 | 8/2009 | Samuels et al. |
| 2009/0252148 A1* | 10/2009 | Dolganow et al. ............ 370/351 |
| 2010/0135186 A1 | 6/2010 | Choong et al. |
| 2010/0246393 A1 | 9/2010 | Chamas et al. |

OTHER PUBLICATIONS

Fujitsu: Ethernet Service OAM; Overview, Applications, Deployment, and Issues; publication date: Mar. 2, 2006.

Ng, See Leng et al. "End-to-end Based QoS provisioning in an ALL-IP Network" Sep. 23-26, 2005.

Manousos, Michael et al. "Voice-Quality Monitoring and Control of VOIP" Jul. 2005.

www.sipcenter.com "What is SIP?" Jun. 2001.

Pangalos, P.A. et al "End-to-end SIP based real time application adaptation during unplanned vertical handovers," Global Telecommunications Conference, 2001. GLOBECOM '01.IEEE, vol. 6, No., pp. 3488-3493 vol. 6, 2001.

Yoshimura, T. et al. "Rate and robustness control with RTP monitoring agent for mobile multimedia streaming," Communications, 2002, ICC 2002. IEEE International Conference on, vol. 4, No., pp. 2513-2517 vol. 4, 2002.

J. Rosenburg et al. "SIP: Session Initiation Protocol" IETF RFC 3261, Jun. 2002.

International Telecommunication Union, H.323 Series H. Audiovisual and Multimedia Systems, Infrastructure of audiovisual services—Systems and terminal equipment for audiovisual services—Visual telephone systems and equipment for local area networks which provide a non-guaranteed quality of service, Nov. 1996, ITU; cover page, pp. i-v, pages.

Newton, Harry "Newton's Telecom Dictionary " 23 Edition 2007.

* cited by examiner

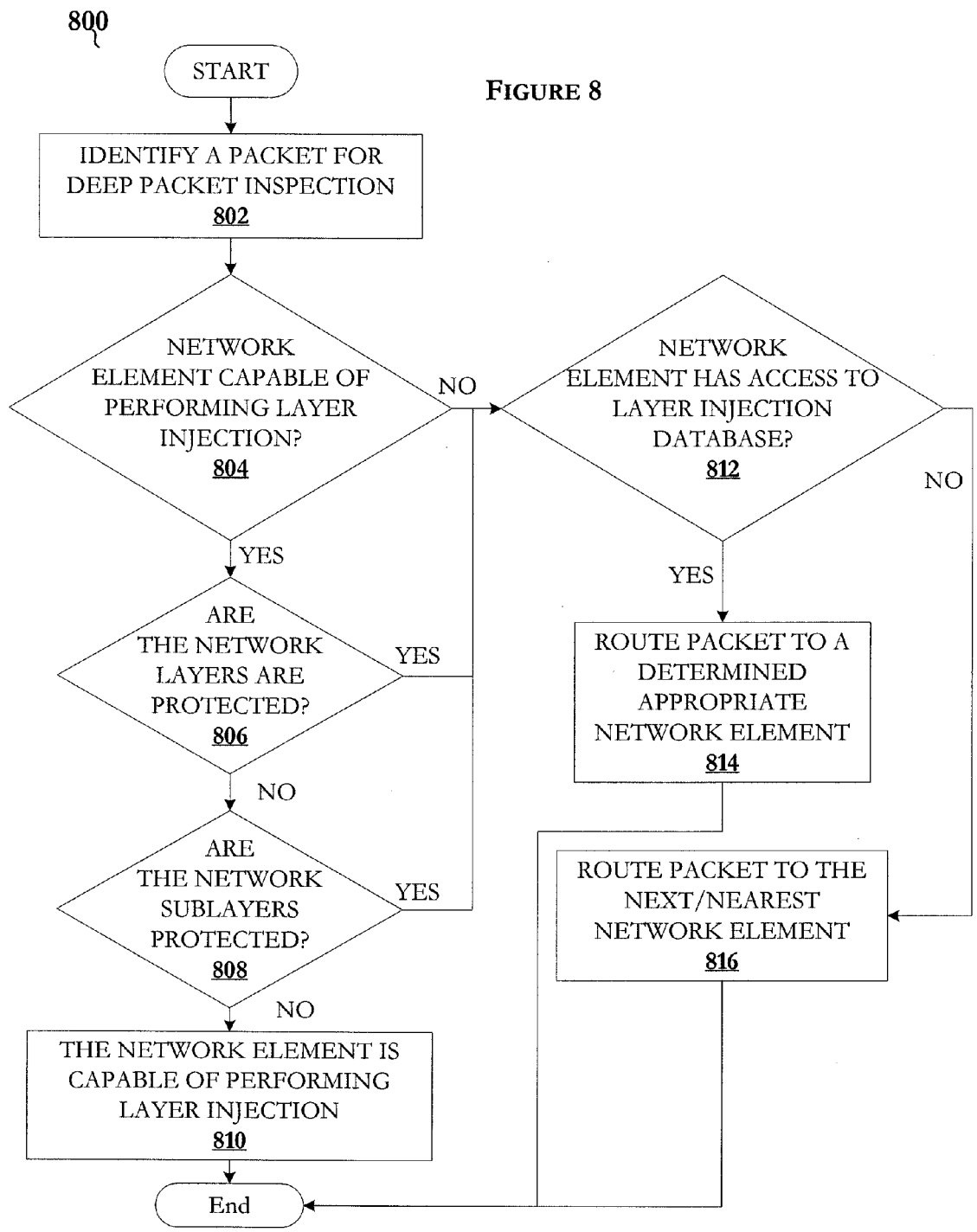

SYSTEM AND METHOD FOR MODIFYING NETWORK TRAFFIC

CROSS-REFERENCE TO RELATED APPLICATIONS

This application is a Continuation-in-Part of U.S. patent application Ser. No. 12/052,562 filed on Mar. 20, 2008 now abandoned, Ser. No. 12/128,763 filed on May 29, 2008, Ser. No. 12/044,821 filed on Mar. 7, 2008, and Ser. No. 11/809,407 filed on May 31, 2007; the entire teachings of which are incorporated herein by reference.

BACKGROUND

Deep packet inspection (DPI) is an advanced method of packet filtering that functions at the upper layers of the OSI (Open Systems Interconnection) reference model. The upper layers (e.g., layers 4-7 of the OSI model) provide services for an application program to ensure that effective communication with another application program in a network is possible. The application layer is not the application itself that is doing the communication. It is a service layer that ensures that the other party is identified and can be reached, authenticates either the message sender or receiver or both, ensures that necessary communication resources/hardware exist, determines error recovery procedures, data integrity, privacy, protocol, and data syntax rules at the different network protocol levels.

SUMMARY OF THE INVENTION

The disclosed embodiments include a system and method for modifying network traffic. For example, in one embodiment, the method includes receiving a packet at an intermediate network node at a network layer. The intermediate network node is located along a communication path within a network between a sending device and a receiving device. The packet is associated with a communication flow between the sending device and the receiving device. The method determines at the intermediate network node whether layer injection can be performed at the intermediate network node. If layer injection can be performed at the intermediate network node, the method identifies at least one of an application or protocol associated with the packet using deep packet inspection. The method determines a routing modification based on the identified application or protocol. The method performs the routing modification on the packet.

In another embodiment, an apparatus is disclosed that includes a network interface component for receiving a packet transmitted between a sending device and a receiving device. The apparatus includes a memory component for storing executable instructions, and at least one processor configured to execute the executable instructions to perform the steps of determining whether layer injection can be performed at the intermediate network node, identifying at least one of an application or protocol associated with the packet using deep packet inspection in response to a determination that layer injection can be performed at the intermediate network node, determining a routing modification based on the identified application protocol, and performing the routing modification on the packet.

BRIEF DESCRIPTION OF THE DIAGRAMS

FIG. 8 is a schematic diagram illustrating a process for determining whether a network element is capable of performing layer injection in accordance with one embodiment.

DETAILED DESCRIPTION

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
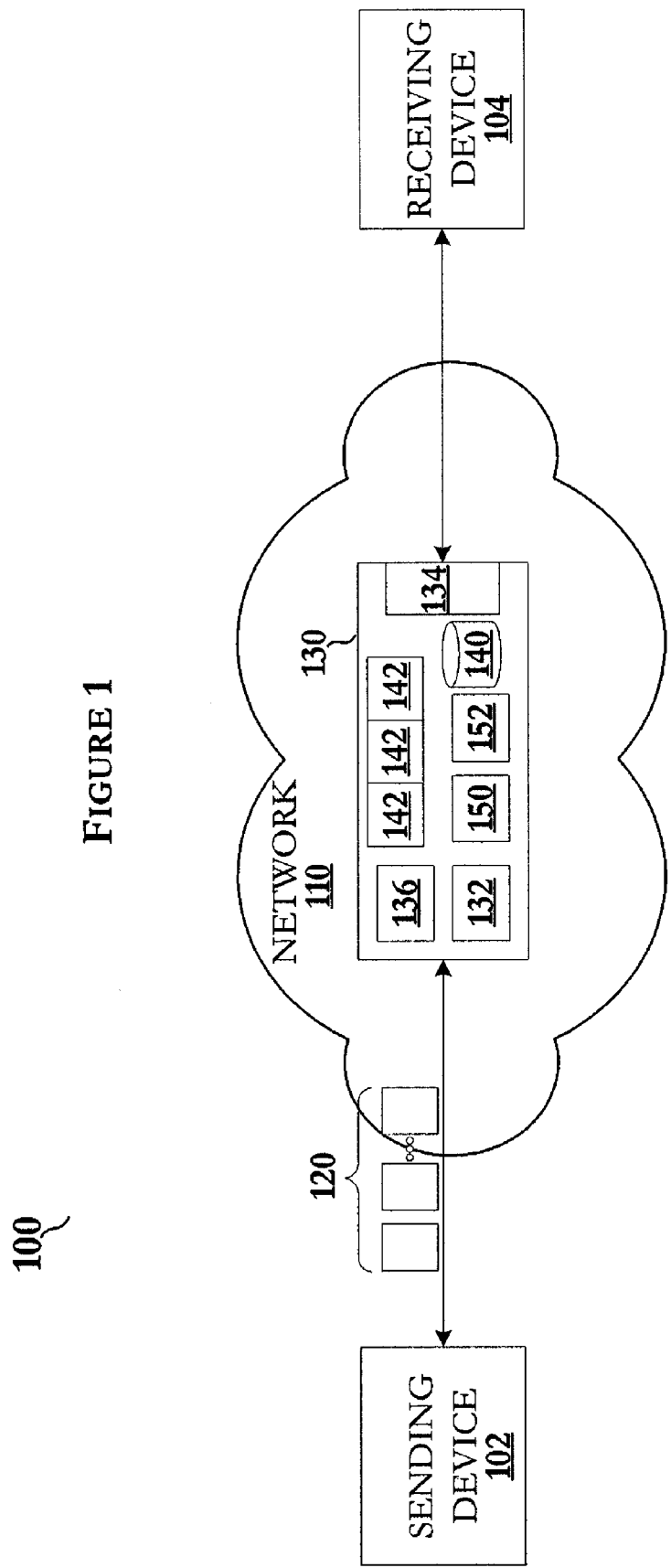
FIG. 1 is a schematic diagram illustrating a network environment in accordance with an embodiment of the invention.

FIG. 1 depicts an embodiment of a network environment 100 in which certain illustrative embodiments may be implemented. The network environment 100 includes a sending device 102 and a receiving device 104 that are in communication via a network 110. The network 110 may be any type of network capable of connecting and transmitting data packets (e.g., packet 120) between the sending device 102 and the receiving device 104. For instance, the network 110 may include a wide area network, a local area network, one or more private networks, and the Internet. The network 110 may include a plurality of network nodes (not depicted) such as routers, network access points/gateways, DNS servers, proxy servers, and other network nodes for assisting in routing of data packets between devices.

The sending device 102 and the receiving device 104 may be any type of data processing system, including, but not limited to a personal computer, a smart phone, a Web server, or any other devices communicating on network 110. Although the devices are referred to as a sending device and a receiving device, both the sending device 102 and the receiving device 104 may send and receive data packets via the network 110. The sending device 102 and the receiving device 104 may transmit a plurality/stream of data packets containing any type of data including real-time data and non-real-time data. Real-time data contains data associated with real-time communications in which data is exchanged instantly or with negligible latency. Although real-time data might pass through several intermediate nodes, real-time data goes from source to destination without having to be stored in between. Real-time communications include voice communications, instant messaging, and video communications. In contrast, non-real-time data (e.g., e-mail communications)

usually involves some form of data storage between the source and the destination, and there is a significant delay between the transmission and the receipt of the information.

As illustrated in FIG. 1, data packets transmitted between the sending device 102 and the receiving device 104 are received by an intermediate network node 130. In one embodiment, the network node 130 may be any intermediate network node along a communication path between the sending device 102 and a receiving device 104 such as a level 3 router or a network access point. In other embodiments, the network node 130 may be a network controller or other similar device that is operable to control network traffic within the network 110. In these embodiments, a service provider may route all packets through the network node 130.

As illustrated, the network node 130 includes at least one processor 132, a network interface component 134, and a memory component 136. The network interface component 134 enables the network node 130 to send and receive data via the network 110. The memory component 136 may include main memory and secondary storage memory for storing data and executable instructions that are used and executed by the processor 132. For example, in one embodiment, the network node 130 may include a layer injection database 140, one or more priority queues 142, a deep packet inspection module 150, and a layer inspection module 152.

In one embodiment, the layer injection database 140 contains a list of network elements/nodes capable of performing layer injection. Layer injection as referenced herein refers to a process of passing information from one protocol layer/sublayer (e.g., layer 3 of the OSI model) to another layer/sublayer (layers 4-7 of the OSI model) for modifying the data packets or communications between the sending device 102 and the receiving device 104. In certain embodiments, information gathered from performing deep packet inspection of the packet may be passed from one layer to another layer for enabling the network node 130 to modify the packet 120 and/or the communications between the sending device 102 and the receiving device 104. In an alternative embodiment, the layer injection database 140 may be located within the network 110 and accessed remotely by the network node 130.

The one or more priority queues 142 may be used by the network node 130 to store data packets that are waiting processing and/or transmission. For example, the network node 130 may include a low priority data queue, a medium priority data queue, and a high-priority data queue. The network node 130 utilizes the one or more priority queues 142 to modify/control network traffic in accordance with preset configurations. For example, in one embodiment, if the network node 130 identifies the packets between the sending device 102 and the receiving device 104 as being associated with peer-to-peer (p2p) traffic, the network node 130 may place the data packets in a low priority data queue. In another embodiment, if the network node 130 identifies the packets as being sent from a prohibited sender, the network node 130 may prevent transmission of the data packets from the sending device.

The deep packet inspection module 150 identifies one or more packets, such as the packet 120, as they traverse through the network node 130 using deep packet inspection (DPI) techniques to produce deep packet inspection (DPI) information. The DPI information may include traffic priority information associated with the one or more packets. In addition, the deep packet inspection module 150 may identify the application or protocol associated with the data packets or communications between the sending device 102 and the receiving device 104. In some embodiments, that network node 130 may transmit the deep packet inspection information to other network elements/nodes for modifying the network traffic including sending the deep packet inspection information to the sending device 102 and/or the receiving device 104.

With deep packet inspection, signatures are used to identify specific network applications and protocols in use over a network. In their most broad sense, signatures are patterns of data bit "recipes" which are chosen to uniquely identify an associated application or protocol. When a new application or protocol is encountered, the data packets of the new application are analyzed and an appropriate signature is developed and added to a database, typically referred to as a signature library. In an embodiment of the invention, packets transmitted by a particular application or protocol are received, and the packets are analyzed using deep packet inspection to generate a signature. The signature may then be compared to entries in the signature library, and if a match is found, the data packets are identified as being associated with a particular application or protocol identified in the signature library.

Application signatures should be updated on a regular basis as they tend to vary as new application updates or protocol revisions occur. For example, peer-to-peer file sharing applications tend to upgrade their client software on a regular basis and encourage, and, in some cases, even force users to move on to the new release. The use of these new releases with non-up-to-date signatures affects classification performance.

Although a signature is developed with the intention to uniquely and completely identify its related application or protocol, there are cases in which the signature is not robust (e.g., a weak signature) and classification problems arise. False positives are the basic terminology referring to misclassification, or in simple terms, the likelihood that an application will be identified as something it is not If DPI is being used for guiding a subscriber management tool, this may lead to wrongful actions. A typical example of such a wrongful action could be the mistaken lowering of priorities to time-sensitive streaming traffic and the resultant introduction of unwanted latency or even packet loss. Consequently, when developing signatures, every effort should be made to achieve a low percentage of false positives. A common way to strengthen a weak signature is to use a combination of more than one pattern. False negatives refers to those cases where it is not possible to consistently identify an application—sometimes the identification is classified, while other times it is missed by the classification tool. The most common reason for this phenomenon is that some applications can accomplish similar outcomes in several ways in different deployment scenarios. For example, some applications behave differently if the client software operates through a proxy or firewall compared to a simpler case in which the client interacts with the web directly.

Several analysis techniques are used in deep packet inspection to identify and classify traffic to generate a signature. These range from analysis by port, by string match, by numerical properties, by behavior and heuristics. Analysis by port is probably the easiest and most well known form of signature analysis because many applications use either default ports or some chosen ports in a specific manner. A good example is Post Office Protocol version 3 (POP3) used for email applications. An incoming POP3 connection typically uses port 110, and if it is a secure connection, it will use port 95. The outgoing SMTP is port 25. However, since it is very easy to detect application activity by port, this is in fact a weakness, particularly because many current applications disguise themselves as other applications. The most notorious example is the Port 80 syndrome, where many applications camouflage as pure HTTP traffic. Some applications select random ports instead of using fixed default ports. In this case, there is often some pattern involved in the port selection process, for example, the first port may be random, but the next will be the subsequent one, and so forth. However, in some cases the port selection process may be completely random. For all these reasons, it is often not feasible to use analysis by port as the only tool for identifying applications, but rather as a form of analysis to be used together with other tools.

Analysis by string match involves searching for a sequence (or string) of textual characters or numeric values within the contents of a packet. Furthermore, string matches may include several strings distributed within a packet or several packets. For example, many applications still declare their names within the protocol itself, e.g., Kazaa™, a peer-to peer program, where the string "Kazaa" can be found in the User-Agent field with a typical HTTP GET request. From this example, it is possible to understand the importance of DPI for correct classification. If analysis is performed by port analysis alone, then port 80 may indicate HTTP traffic and the GET request will further corroborate this observation. If the User-Agent field information is missing, this analysis results in inaccurate classification (e.g., HTTP and not Kazaa).

Analysis by numerical properties involves the investigation of arithmetic characteristics within a packet or several packets. Examples of properties analyzed include payload length, the number of packets sent in response to a specific transaction, and the numerical offset of some fixed string (or byte) value within a packet. For example, consider the process for establishing a TCP connection using some user datagram protocol (UDP) transactions in Skype (versions prior to 2.0). The client sends an 18 byte message, expecting in return an 11 byte response. This is followed by the sending of a 23 byte message, expecting a response which is 18, 51 or 53 bytes. Using numerical analysis combined with other techniques of deep packet inspection, such a pattern can be detected and the particular application can be identified.

Figure 2:
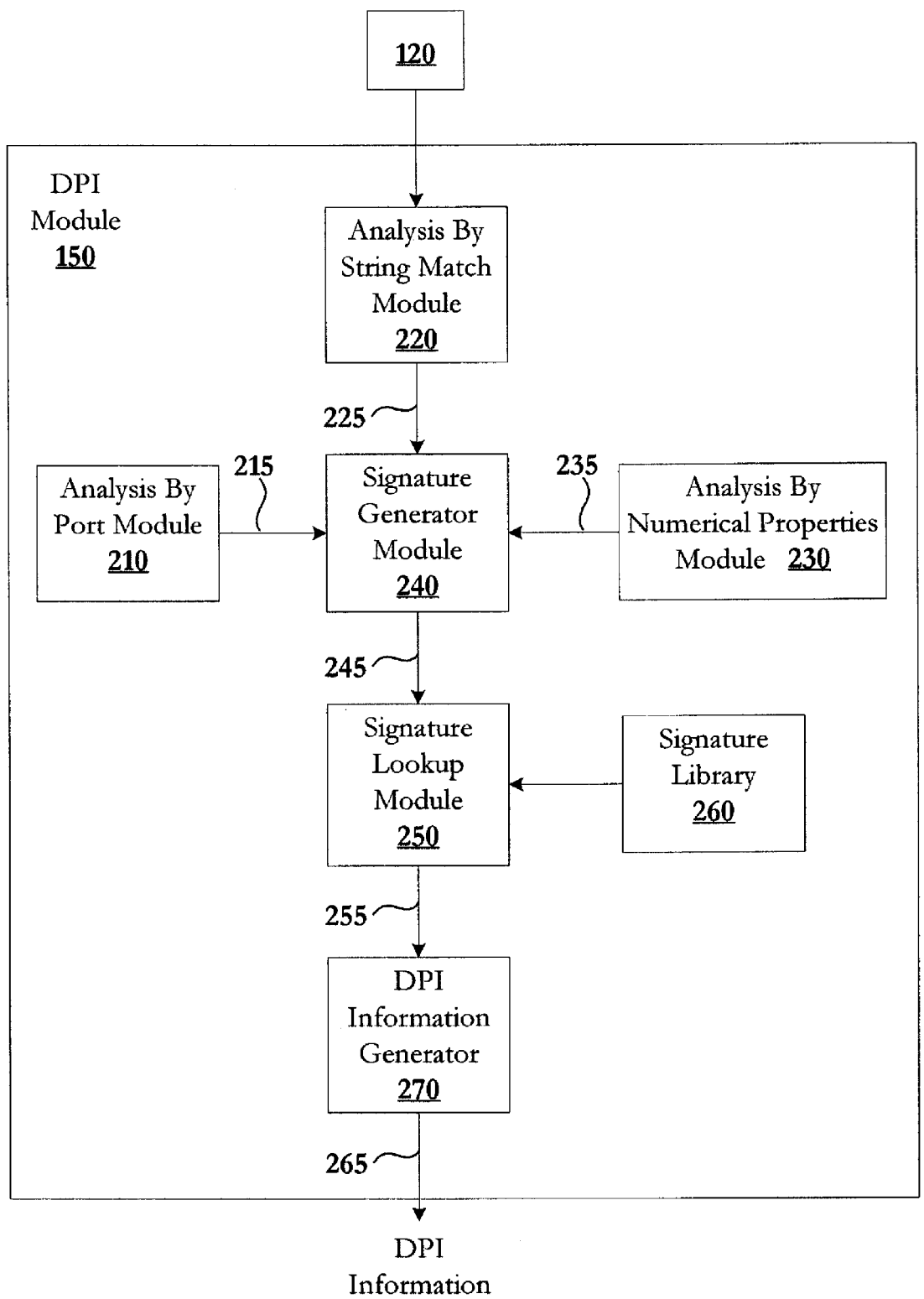
FIG. 2 is a schematic diagram illustrating a deep packet inspection module in accordance with one embodiment.

FIG. 2 is a schematic diagram illustrating the deep packet inspection module 150 in accordance with one embodiment. The DPI module 150 includes an analysis by port module 210, an analysis by string match module 220, and an analysis by numerical properties module 150. The packet 120 is received by the DPI module 150 and is provided to each of the analysis by port module 210, the analysis by string match module 220, and the analysis by numerical properties module 150. The analysis by port module 210 performs analysis by port DPI techniques, such as those described herein, upon the packet 120 to generate a result 215. The analysis by string match module 220 performs analysis by string DPI techniques, such as those described herein, upon the packet 120 to generate a result 225. The analysis by numerical properties module 230 performs analysis by numerical properties DPI techniques, such as those described herein, to generate a result 235. Results 215, 225, and 235 are provided to a signature generator module 240. The signature generator module 240 generates a DPI signature 245 associated with the packet 120 based upon results 215, 225, and 235. The DPI signature 245 is provided to a signature lookup module 250. The signature lookup module 250 performs a lookup of the DPI signature 245 from a signature library 260 to determine an identity 255 of one or more of a particular application and protocol associated with the packet 120. The identity 255 is provided to a DPI information generator 270 that functions to determine DPI information 265 based upon the identity 255.

The DPI module 150 returns the DPI information to the network node 130, which utilizes the DPI information for performing layer injection and modifying the data packets and/or communications between the sending device 102 and the receiving device 104. In various embodiments, the DPI information is inserted into a specific field within a network layer packet by the intermediate network node 130 and sent to a centralized network controller.

Figure 3:
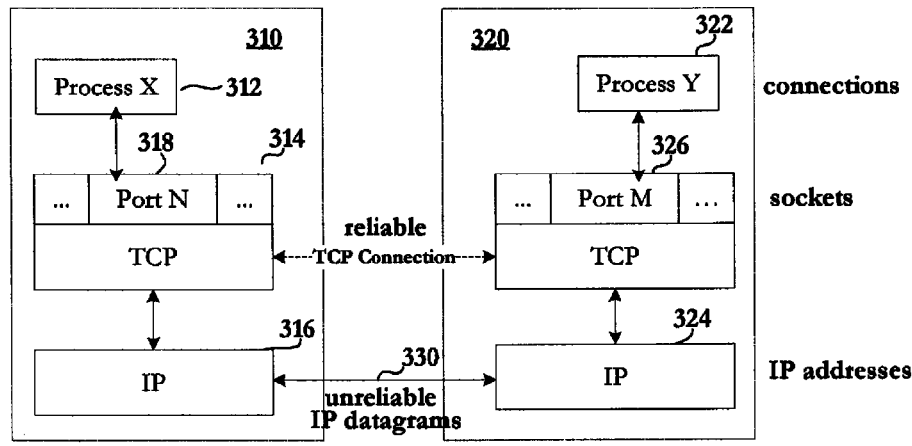
FIG. 3 is a schematic diagram illustrating a TCP/IP connection between two devices in accordance with one embodiment.

FIG. 3 is a schematic diagram illustrating a TCP/IP connection between two devices, a device 310 and a device 320, in accordance with one embodiment. The device 310 and the device 320 illustrate the communication between the sending device and the receiving device in accordance with an embodiment. At the upper protocol layers 312, e.g., layers 4-7 of the OSI model, the device 310 executes a process X for an application running on the device 310 for exchanging data between a process Y executed at the upper protocol layers 322 for an application running on the device 320.

At the TCP layer, or transport layer (layer 4 of the OSI model), the device 310 establishes as a TCP connection with the device 320 for exchanging data. TCP is a full duplex protocol, meaning that each TCP connection supports a pair of byte streams, one flowing in each direction. TCP includes a flow-control mechanism for each of these byte streams that allows the receiver to limit how much data the sender can transmit. TCP also implements a congestion-control mechanism. Each side of a TCP connection has a socket which can be identified by the pair <IP_address, port_number>. Two processes communicating over TCP form a logical connection that is uniquely identifiable by the two sockets involved, that is by the combination <local_IP_address 316, local_port 318, remote_IP_address 324, remote_port 326>.

The transport layer is concerned with getting Layer 4 messages-called segments or, more formally, transport protocol data units (TPDUs)—from source to destination in a reliable manner. The perspective of Layer 4 is of end-to-end communications rather than the hop-by-hop perspective of Layer 3. Layer 4 assumes that packets can be moved from network entity to network entity, eventually getting to the final destination host. Layer 4 is not concerned with the actual routing of the packets.

At the IP layer, or network layer 330 (layer 3 of the OSI model), the device 310 assigns the local_IP_address 316 and the remote_IP_address 324 to data packets transmitted to the device 320. The network layer 330 defines the functions necessary to support data communication between indirectly-connected entities. It provides the capability of forwarding messages from one Layer 3 entity to another until the final destination is reached. Layer 3 protocols may be connection oriented or connectionless. A connection-oriented Layer 3 protocol, such as X.25 (ISO 8208), operates more statically. The basic idea is that an end-to-end route (X.25 virtual connection) is established from the originating data terminal equipment (DTE) to data communications equipment (DCE), from DCE to DCE through the network, then from the last DCE to the terminating DTE; this is the call setup. Packets are then transmitted via this prearranged route, with all packets following the same path through the network. Finally the route is torn down (release) and packets cease flowing.

Connectionless Layer 3 protocols, such as the ever popular internet protocol (IP) (RFC 791 and 792) and its ISO counterpart connectionless network protocol (CLNP) (ISO 8473), route packets dynamically. There is no prearranged path which is followed by subsequent packets flowing from one host to another. Instead each packet is individually routed through a routing mesh; there is no reason to believe that sequential packets flowing between hosts will follow the same path. So sequence errors may be introduced at Layer 3, which must be corrected by a higher layer entity.

Connectionless data packets are commonly referred to as datagrams and the service provided by connectionless Layer 3 protocols is referred to as datagram service. Stateless datagram service is simpler for Layer 3 entities than connection-oriented network layer services. Because there is no state information to maintain, dynamic routing protocols can be used. If a router fails during the dialogue between two communicating hosts, neighboring routers will discover this via the routing protocols and find alternate routes which bypass the failed router.

Figure 4:
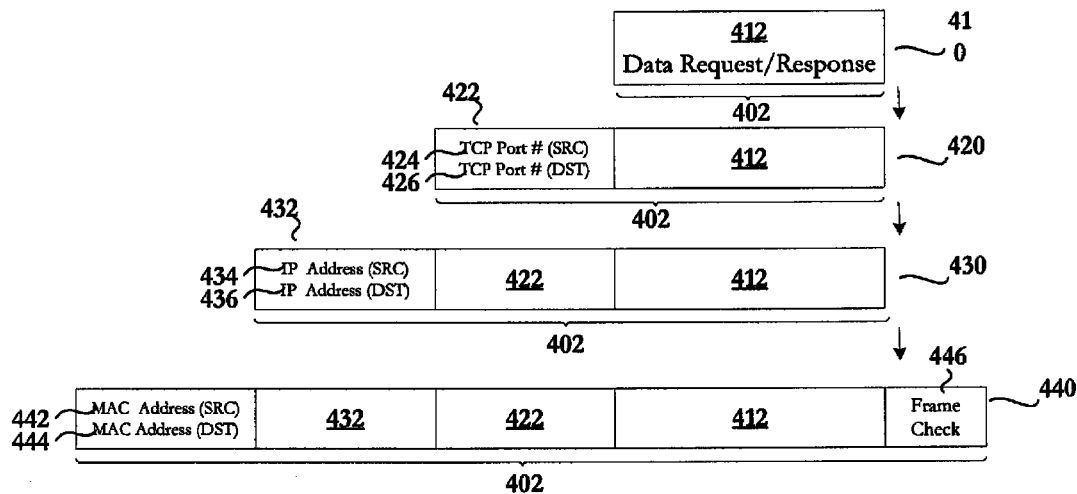
FIG. 4 is a schematic diagram illustrating a data packet as it traverse different layers of a network communication protocol in accordance with one embodiment.

FIG. 4 is a schematic diagram illustrating a data packet 402 as it traverse different layers of a network communication protocol in accordance with one embodiment. At the upper protocol layers 410, an application executes a process for generating a data response or a data request 412 that is encapsulated in the data packet 402. The data packet 402 is passed to the transport layer 420 (i.e., layer 4 of the OSI model, or the TCP layer in the TCP/IP model). At the transport layer 420, a TCP header 422 is added to the data packet 402. As will be further described, the TCP header 422 contains a source port 424 and a destination port 426. Ports can be thought of as separate channels on each device. The source port 424 and the destination port 426 plus the source and destination IP addresses, combine to uniquely identify each TCP connection.

Once the TCP header 422 is added to the data packet 402, the packet 402 is passed to the network layer 430 (i.e., layer 3/IP layer of the OSI model). At the network layer 430, an IP header 432 is added to the data packet 402 containing a source IP address 434 and a destination IP address 436. The source IP address 434 and the destination IP address 436 uniquely identifies a source device and a destination device on the network for enabling data to be a routed to the identified devices.

Finally, the data packet 402 is passed to a network interface layer 440 (layers 1 and 2 of the OSI model), where a source Media Access Control address (MAC address) 442 and a destination MAC addresses 444 are added to the data packet 402. The MAC address is a unique identifier assigned to most network adapters or network interface cards (NICs) by the manufacturer for identification, and used in the Media Access Control protocol sub-layer. In TCP/IP networks, the MAC address of a subnet interface can be queried with the IP address using the Address Resolution Protocol (ARP) for Internet Protocol Version 4 (IPv4) or the Neighbor Discovery Protocol (NDP) for IPv6. On broadcast networks, such as Ethernet, the MAC address uniquely identifies each node on that segment and allows frames to be marked for specific hosts. It thus forms the basis of most of the Link layer (OSI Layer 2) networking upon which upper layer protocols rely to produce complex, functioning networks. In addition, a frame check/trailer 446 may be added to the data packet 402 for enabling error detection. The packet 402 is then transmitted across the network 110 to a destination device identified by the header information contained in the packet 402.

Figure 5:
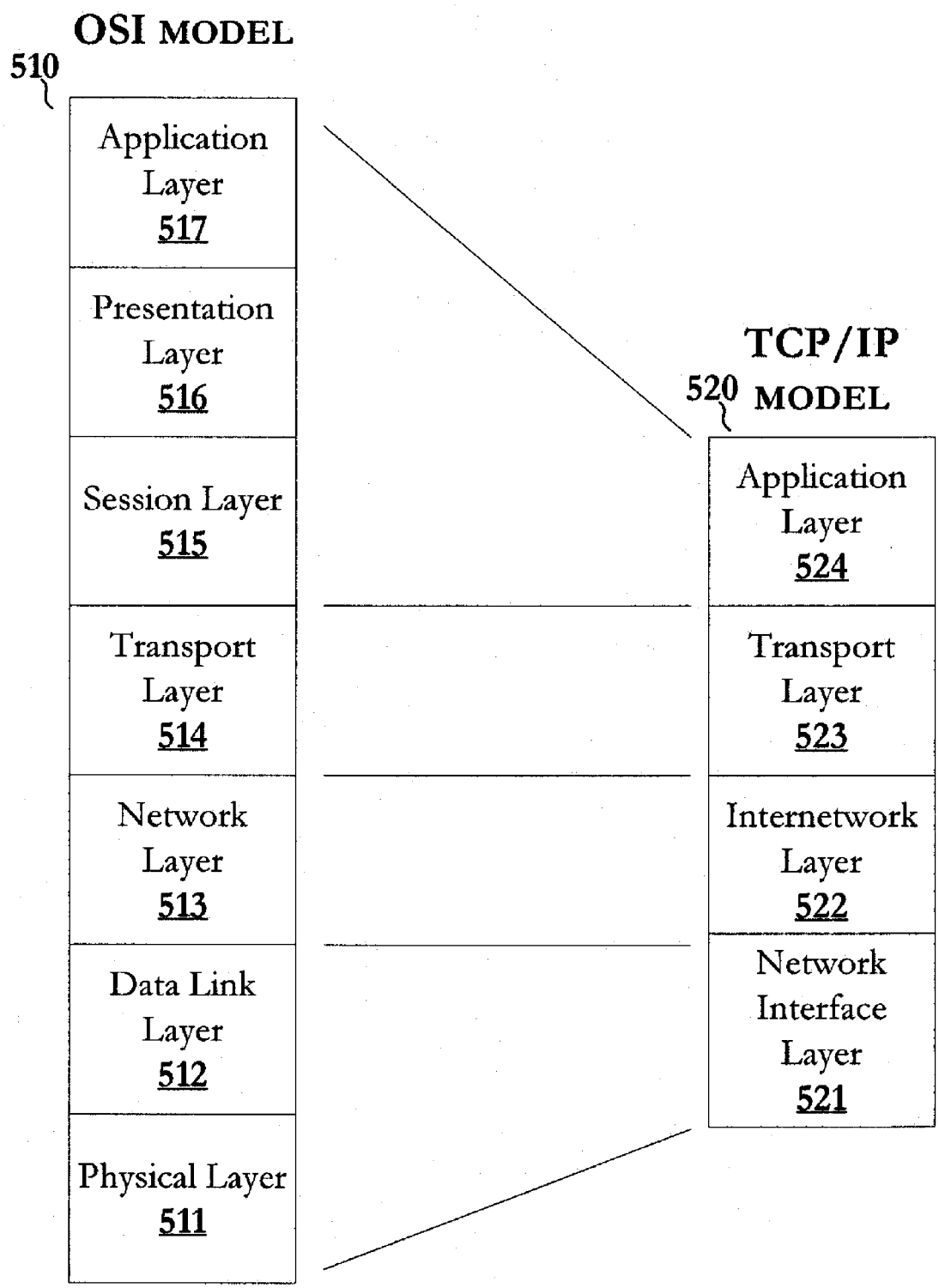
FIG. 5 is a schematic diagram illustrating a mapping between the different layers of the OSI model and the TCP/IP protocol model in accordance with one embodiment.

FIG. 5 is a schematic diagram illustrating a mapping between the different layers of the OSI model 510 and the TCP/IP protocol model 520 in accordance with one embodiment. The OSI model is divided into 7 layers starting with an application layer 517 on top (layer 7) and ending with a physical layer 511 (layer 1). The TCP/IP protocol model 520 comprises 4 layers starting with an application layer 524 on top (layer 4) and ending with a network interface layer 521 (layer 1). As illustrated, the top 3 layers of the OSI model 510 (layers 5-7) (the application layer 517, a presentation layer 516, and a session layer 515) map to the application layer 524 of the TCP/IP protocol model 520. A transport layer 514 of the OSI model 510 maps to a transport layer 523 of the TCP/IP protocol model 520. A network layer 513 of the OSI model 510 maps to an internetwork layer 522 of the TCP/IP protocol model 520. Finally, a data link layer 512 and the physical layer 511 of the OSI model 510 map to the network interface layer 521 of the TCP/IP protocol model 520. Layers 4-7 of the OSI model or layers 3-4 of the TCP/IP model is referred herein as the upper layers. The scope of the disclosed embodiments may apply to alternative mappings between the OSI model 510 and the TCP/IP protocol model 520 than that depicted in FIG. 5.

Figure 6:
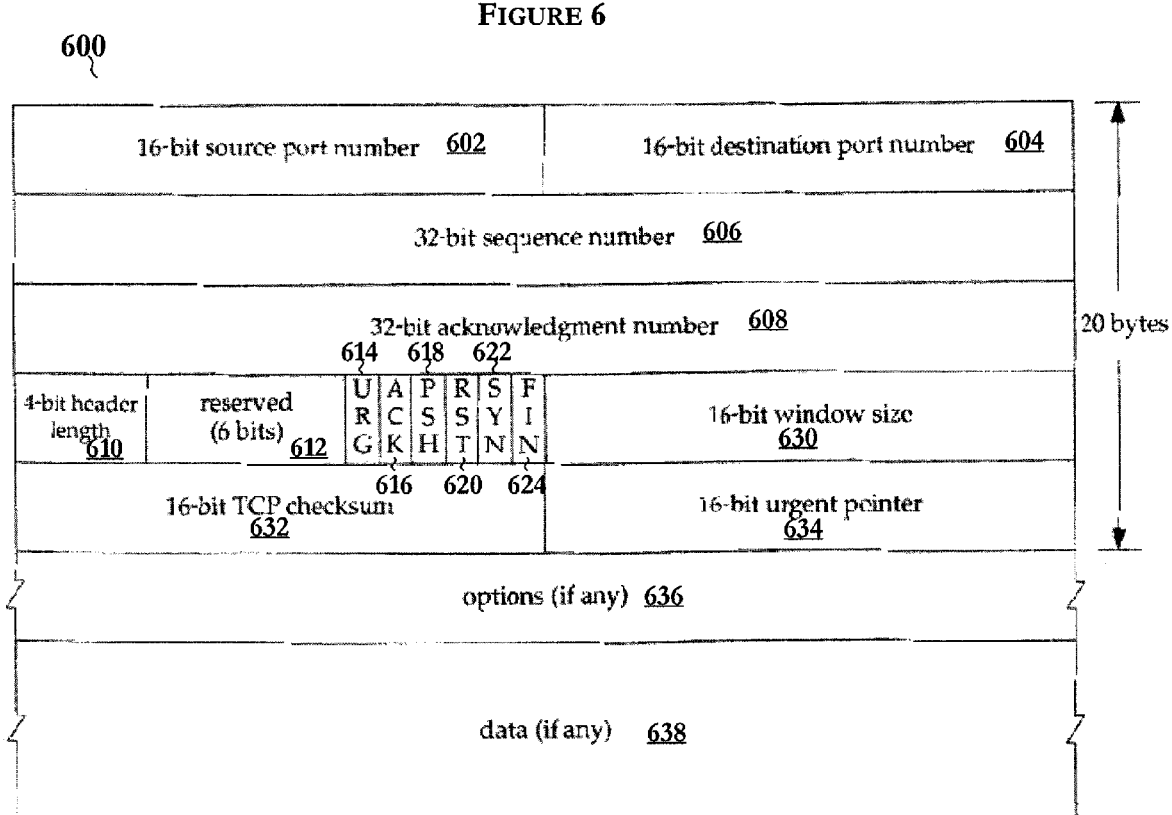
FIG. 6 is a schematic diagram illustrating header information of a data packet in accordance with one embodiment.

FIG. 6 is a schematic diagram illustrating a TCP header 600 of a data packet in accordance with one embodiment. The TCP header 600 includes a source port number 602, a destination port number 604, a sequence number 606, an acknowledgement number 608, a header length 610, a reserved filed 612, control information flags 614-624, an advertised window size 630, a TCP checksum 632, an urgent pointer field 634, an options field 636, and a data field 638.

The source port number 602 and the destination port number 604 identify the source and destination ports, respectively. The sequence number 606 identifies the byte in the stream of data from the sending TCP to the receiving TCP that the first byte of data in this segment represents.

The acknowledgement number 608 field contains the next sequence number that the sender of the acknowledgement expects to receive (i.e., the sequence number of the last successfully received byte of data plus 1). This field is valid only if an acknowledgment flag 616 is on. Once a connection is established the acknowledgment flag 616 is always on.

The acknowledgement number 608, sequence number 606, and the advertised window size 630 fields are all involved in TCP's sliding window algorithm. The acknowledgement number 608 and advertised window size 630 fields carry information about the flow of data going in the other direction. In TCP's sliding window algorithm the receiver advertises a window size to the sender. This is done using the advertised window size 630 field. The sender is then limited to having no more than a value of the advertised window size 630 bytes of unacknowledged data at any given time. The receiver sets a suitable value for the advertised window size 630 based on the amount of memory allocated to the connection for the purpose of buffering data.

The header length 610 gives the length of the header in 32-bit words. This is required because the length of the options field is variable. The control information flags 614-624 are used to relay control information between TCP peers. The possible flags include SYN 620, FIN 624, RESET 618, PUSH 616, URG 614, and ACK 616. The SYN 620 and FIN 624 flags are used when establishing and terminating a TCP connection, respectively. The ACK 616 flag is set any time the acknowledgement number 608 is valid, implying that the receiver should pay attention to it. The URG 614 flag signifies that this segment contains urgent data. When this flag is set, the urgent pointer field 634 indicates where the non-urgent data contained in this segment begins. The PUSH 616 flag signifies that the sender invoked the push operation, which indicates to the receiving side of TCP that it should notify the receiving process of this fact. Finally, the RESET 618 flag signifies that the receiver has become confused and so wants to abort the connection.

The TCP checksum 632 field covers the TCP segment: the TCP header and the TCP data. This is a mandatory field that must be calculated by the sender, and then verified by the receiver. The options field 636 is the maximum segment size option, called the MSS. Each end of the connection normally specifies this option on the first segment exchanged. It specifies the maximum sized segment the sender wants to receive. The data field 638 of the TCP segment is optional.

Figure 7:
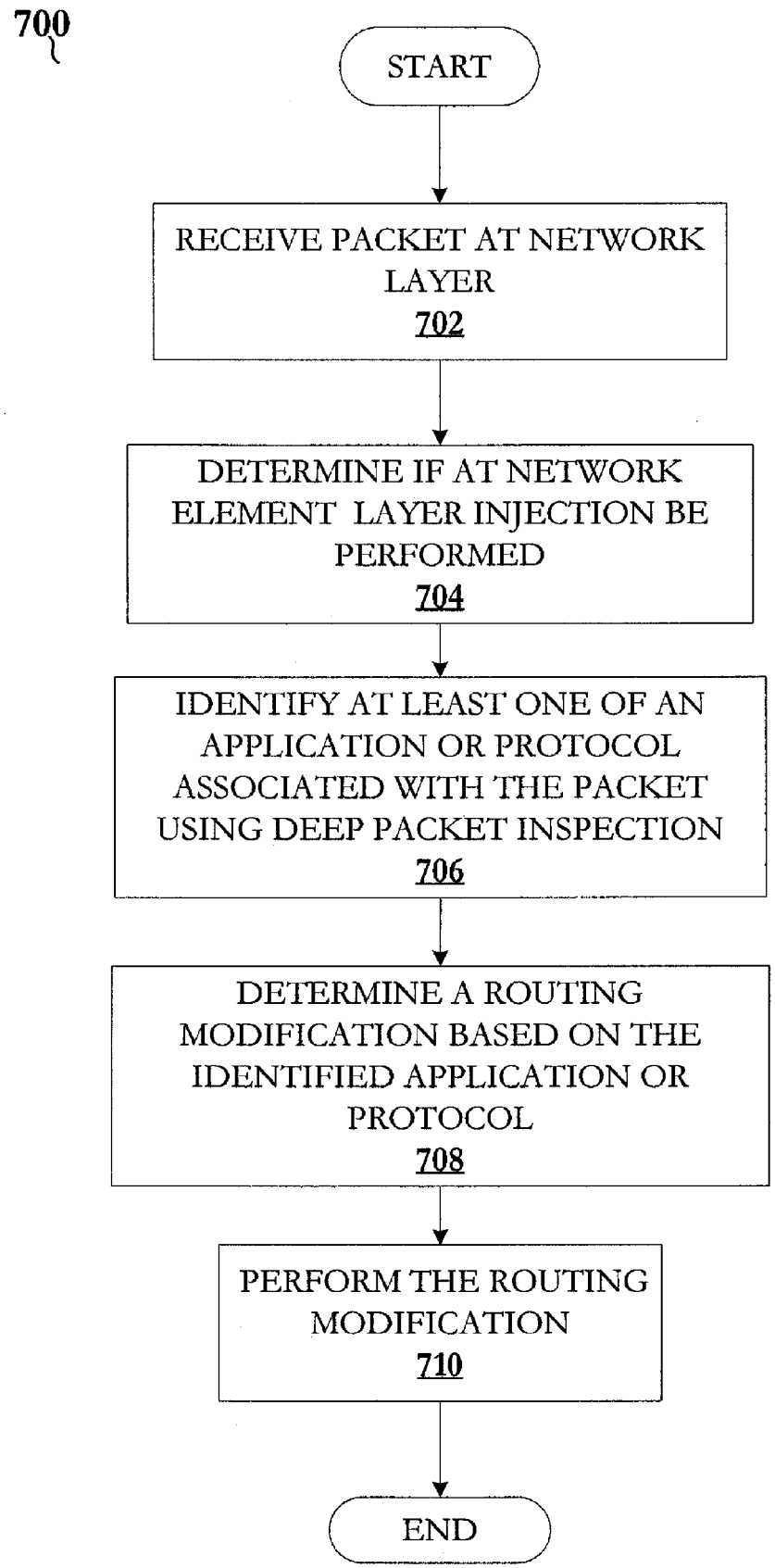
FIG. 7 is a schematic diagram illustrating a process for controlling network traffic in accordance with one embodiment.

In accordance with the disclosed embodiments, the TCP header 600 may be modified by the intermediate network node 130 using layer injection for modifying network traffic. For example, FIG. 7 is a schematic diagram illustrating a process 700 for modifying network traffic in accordance with one embodiment. The process 700 is executed by a network node, and begins at step 702 by receiving a packet at a network layer (e.g., layer 3 of the OSI model) at an intermediate network node. The packet is associated with a communication flow between a sending device and a receiving device. At step 704, the process determines whether layer injection can be performed at the intermediate network node. If layer injection can be performed at the intermediate network node, the process at step 706 identifies at least one of an application or protocol associated with the packet using deep packet inspection. The process may also determine the application or protocol associated with the packet using shallow inspection by examining the header information such as the IP header data and the TCP header data as described above. The process determines a routing modification based on the identified application or protocol at step 708. In some instances, the routing modification may be null (i.e., no modification of routing is to be performed on the packet). Non-limiting examples of routing modifications may include sending the packet to a network controller for gather network performance information, delaying the packet by placing the packet in a low priority network queue, dropping the packet, returning the packet to the sending device, or increasing the priority of the packet by placing the packet in a high priority network queue. In some embodiments, the intermediate network node 130 may increase or decrease the bandwidth for the communication flow between the sending device and the receiving device. In addition, the process may modify the data packet based on the identified application or protocol. For example, the process may modify the URG 614 flag to signify that packet contains urgent data or vice versa. Additionally, if the process delays the packet or decreases the priority of this communication flow between the sending device and the receiving device, the process may alter the advertised window size field of in the TCP header of the data packet for adjusting the TCP sliding window to prevent the sending device from resending the delayed packets. Further, if the process modifies the packet, in some instances, the process also modifies a checksum field associated with the packet to ensure that a transmit error is not detected by the receiving device. At step 710, the process performs the routing modification, if any, on the packet with the process 700 terminating thereafter.

FIG. 8 is a schematic diagram illustrating a process 800 for determining whether a network element is capable of performing layer injection in accordance with one embodiment. The process 800 may be executed by a network node such as the intermediate network node 130 illustrated in FIG. 1. The process 800 begins by identifying a packet for deep packet inspection at step 802. At step 804, the process determines whether the network element is capable of performing layer injection. If the process determines the network element is capable of performing layer injection, the process at step 806 determines if any of the network layers are protected/secured (i.e., unable to inject information into the layers). If the process determines that the network layers are not protected, the process determines whether the network sublayers are protected at step 808. If the network sublayers are also not protected, the process determines at step 810 that the network element is capable of performing layer injection for injecting information from one sublayer to another sublayer between the different OSI layers for modifying network traffic.

However, if the process determines that the network element is not capable of performing layer injection at step 804, or the layers or sublayers are protected at steps 806 and 808, the process at step 812 determines whether the network element has access to a database containing a list of network nodes capable of performing layer injection. If the process has access to the database, the process queries the database for the appropriate network element for forwarding the packet to for performing layer injection. The process may rank the available network elements for determining the appropriate network element for forwarding the packet. For example, the process may rank the available network elements capable of performing layer injection based on a combination of non-limiting factors such as the routing distance of an available network element, the security associated with the available network element, and the available capacity/quality of service of the network element. The process sends the packet to the determined appropriate network element at step 814 with process 800 terminating thereafter. If the process at step 812 determines that the network element does not have access to the database containing the list of network nodes capable of performing layer injection, the process at step 816 routes the packet to the next/nearest network element along the communication path, with process 800 terminating thereafter.

Accordingly, the above disclosure describes a novel and inventive system and method for modifying network traffic. The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. For example, although the described embodiments are directed to deep packet inspection being performed at an intermediate network node, it should be understood that these procedures may be performed at any node within the network. Although some particular embodiments are described with respect to using DPI in a network layer, it should be understood that the principles described herein may be used with any layer regardless of the particular network configuration or technologies used. The following claims set forth a number of the embodiments of the invention disclosed with greater particularity.

The invention claimed is:

1. A method for modifying network traffic, the method comprising:
   receiving a packet at an intermediate network node at a network layer, the packet associated with a communication flow between a sending device and a receiving device;
   determining, by the intermediate network node, whether the intermediate network node is capable of performing layer injection, wherein determining, by the intermediate network node, whether the intermediate network node is capable of performing layer injection includes checking each individual layer of the communication protocol layers and sublayers of the layers of the communication protocol layers to identify individual layers and sublayers that are protected from being modified by the intermediate network node;

responsive to a determination each individual layer of the communication protocol layers and sublayers of the layers of the communication protocol layers are not protected and that the intermediate network node is capable of performing layer injection:

identifying at least one of an application or protocol associated with the packet using deep packet inspection;

determining a routing modification based on the identified application or protocol; and modifying the packet with the determined routing modification.

2. The method of claim 1, further comprising modifying the packet, by the intermediate network node at an upper network layer, based on the identified application or protocol to adjust the communication flow between the sender device and the receiver device, the upper network layer being a protocol layer higher than the network layer.

3. The method of claim 1, further comprising:

determining a second intermediate network node capable of performing layer injection in response to a determination that layer injection cannot be performed at the intermediate network node; and sending the packet to the second intermediate network node.

4. The method of claim 3, wherein determining the second intermediate network node capable of performing layer injection comprises querying a database containing a list of network nodes capable of performing layer injection.

5. The method of claim 4, further comprising:

identifying, at the second intermediate network node, at least one of an application or protocol associated with the packet using deep packet inspection;

determining, by the second intermediate network node, a routing modification based on the identified application protocol; and performing the routing modification on the packet.

6. The method of claim 5, further comprising:

determining, by the second intermediate network node whether the second intermediate network node is capable of performing layer injection;

responsive to a determination that the second intermediate network node is capable of performing layer injection;

identifying at least one of an application or protocol associated with the packet using deep packet inspection;

determining a routing modification based on the identified application protocol; and performing the routing modification on the packet.

7. The method of claim 2, wherein modifying the packet includes modifying an advertised window size field of a TCP header of the data packet.

8. The method of claim 2, wherein modifying the packet includes modifying a checksum field of a TCP header of the data packet.

9. The method of claim 1, further comprising modifying an acknowledgment time between the sending device and the receiving device before another packet is retransmitted.

10. The method of claim 1, wherein the intermediate network node is at least a level 3 network element.

11. The method of claim 1, wherein the intermediate network node is a network access point.

12. The method of claim 1, wherein the intermediate network node is a network controller.

13. The method of claim 1, wherein identifying at least one of an application or protocol associated with the packet includes performing analysis by port, analysis by string match, and analysis by numerical properties on the packet.

14. The method of claim 1, wherein the routing modification includes limiting the available bandwidth for the identified application or protocol.

15. The method of claim 1, wherein the routing modification includes placing the packet in a low priority queue, wherein data packets with higher priority is routed before packet in the low priority queue.

16. The method of claim 1, wherein the routing modification applies only to a receiving data path, the receiving data path being a data path in which the packet traverses in arriving at the intermediate network node.

17. The method of claim 1, wherein the routing modification applies only to a forwarding data path, the forwarding data path being a data path in which the packet traverses from the intermediate network node to one of the sending device or the receiving device.

18. An apparatus for modifying network traffic, the apparatus located in a network along a communication path between a sending device and the receiving device, the apparatus comprising:

a network interface component for receiving a packet transmitted between a sending device and a receiving device;

a memory component for storing executable instructions, and at least one processor, the at least one processor configured to execute the executable instructions to perform the steps of:

determining whether the apparatus is capable of performing layer injection, wherein determining whether the apparatus is capable of performing layer injection includes checking each individual layer of the communication protocol layers and sublayers of the layers of the communication protocol layers to identify individual layers and sublayers that are protected from being modified by the apparatus;

responsive to a determination each individual layer of the communication protocol layers and sublayers of the layers of the communication protocol layers are not protected and that the apparatus is capable of performing layer injection;

identifying at least one of an application or protocol associated with the packet using deep packet inspection;

determining a routing modification based on the identified application protocol; and modifying the packet with the determined routing modification.

19. The apparatus of claim 18, wherein the memory component further stores data containing a list of network elements capable of performing layer injection.

* * * * *